Figure 1:
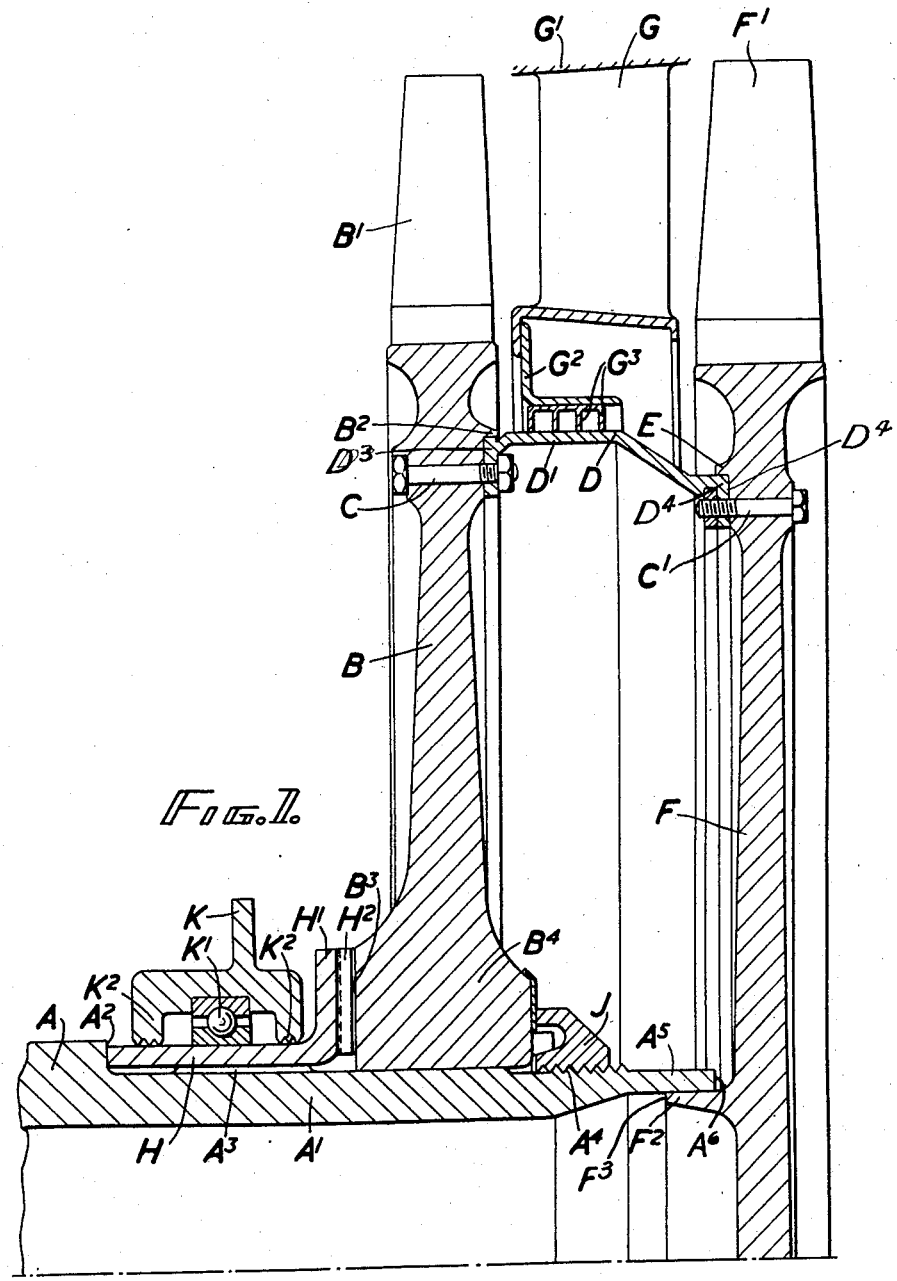

Nov. 18, 1958  F. B. HALFORD ET AL  2,860,851
MULTI-STAGE TURBINE ROTOR ASSEMBLIES
Filed Dec. 11, 1953  2 Sheets-Sheet 1

INVENTORS
FRANK B. HALFORD &
WILLIAM KER WILSON
BY
Holcombe, Wetherill & Brisebois  ATTORNEYS Nov. 18, 1958  F. B. HALFORD ET AL  2,860,851
MULTI-STAGE TURBINE ROTOR ASSEMBLIES
Filed Dec. 11, 1953                              2 Sheets-Sheet 2

INVENTORS
FRANK B. HALFORD &
WILLIAM KER WILSON

BY
Holcombe, Wetherill & Brisebois    ATTORNEYS

United States Patent Office 2,860,851
Patented Nov. 18, 1958

2,860,851

MULTI-STAGE TURBINE ROTOR ASSEMBLIES

Frank Bernard Halford and William Ker Wilson, Edgware, England, assignors to The De Havilland Engine Company Limited, Edgware, England, a British company Application December 11, 1953, Serial No. 397,708

5 Claims. (Cl. 253—39.15)

This invention relates to multi-stage turbine rotor assemblies of the kind comprising at least two spaced parallel blade-carrying discs connected to a rotor shaft, and has for its object to provide an improved construction of such a rotor assembly which will be both light and satisfactory.

According to the present invention a multi-stage turbine rotor assembly comprises at least two spaced parallel blade-carrying discs, means for connecting one of such discs rigidly to a shaft, means for supporting the second disc from the shaft in a manner maintaining it concentric with the shaft but permitting it limited free axial movement and movement of rotation relatively to the shaft, and a tubular connecting piece concentric with the discs and extending between and rigidly connected to parts of the two discs situated adjacent to their outer circumferences.

The connection between each of the discs and the tubular connecting piece conveniently includes a spigot joint with the male and female parts so arranged that under centrifugal stresses during operation the spigot joint will tend to tighten. Thus the male part of each spigot joint may be formed on the tubular connecting piece while the female part is carried by the disc since in most cases the disc will tend to be held from radial expansion under centrifugal loads to a greater degree than the tubular connecting piece.

It will be understood that when the invention is applied to a rotor comprising three or more stages, one of the discs only, usually the high pressure stage disc, will be rigidly connected to the shaft while each of the remaining discs will be supported from the shaft in a manner maintaining it concentric with the shaft but permitting it limited axial movement and movement of rotation relatively thereto and will be connected to the adjacent disc or each of the adjacent discs by means of a tubular connecting piece concentric with the discs and extending between and rigidly connected to the two discs between which it extends at points situated adjacent to the outer circumferences of such discs. Thus successive discs are fixedly secured to each other at their blade carrying circumferences but are free to move to a limited extent at the rotor shaft due to rotational stresses and changes in temperature. Moreover in any case the tubular connecting piece or each tubular connecting piece conveniently includes a cylindrical external surface arranged to cooperate with fixed sealing means to constitute a fluid seal for preventing unwanted leakage of working fluid between the two stages connected by the connecting piece.

The means for securing the appropriate disc rigidly to the shaft may vary but in a preferred arrangement comprise a sleeve which has internal splines engaging external splines on the shaft and bears at one end against an abutment shoulder on the shaft either directly or through one or more members constituting distance pieces and has a flange formed on its end remote from the abutment shoulder with radial splines or ribs formed on the face of the flange remote from the abutment shoulder and engaging corresponding radial splines or ribs on one face of the disc, the disc being clamped firmly against the flange by a suitable clamping nut or the equivalent on the shaft.

Two constructions according to the invention are illustrated by way of example in the accompanying drawings, in which—

Figure 2:
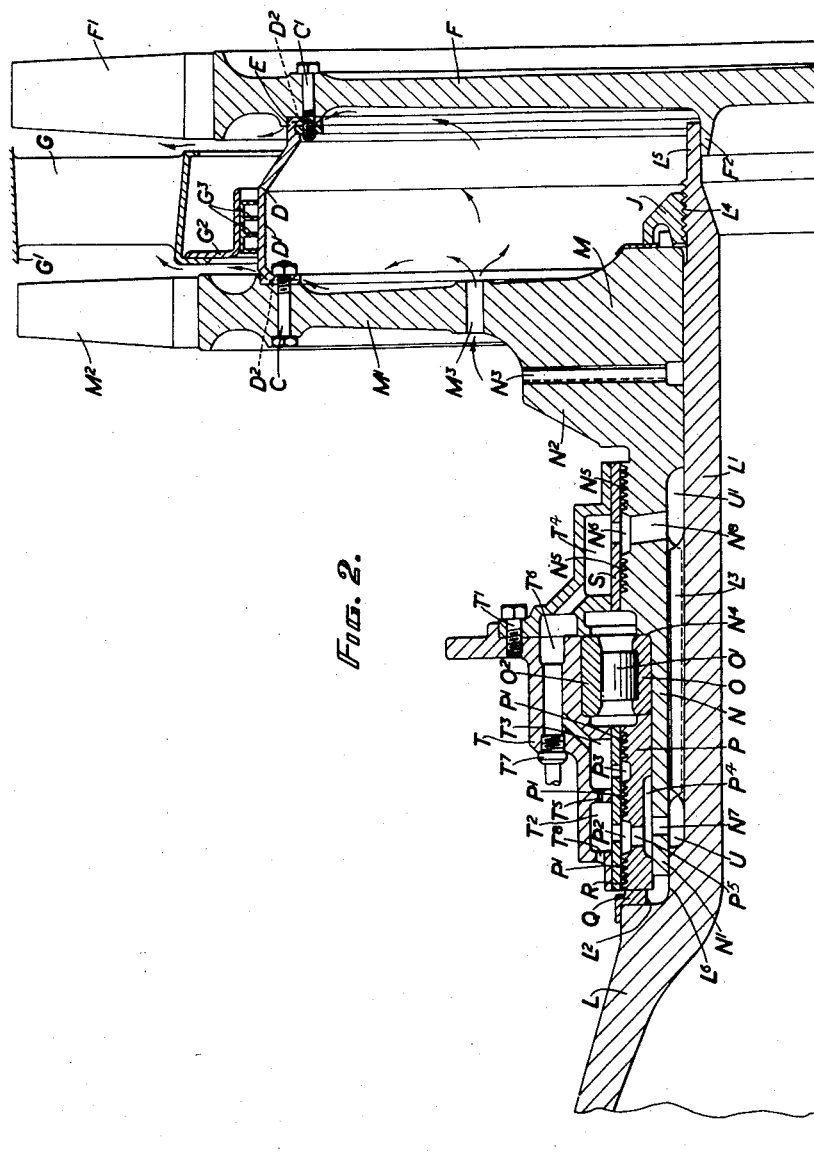

Figure 1 is a sectional side elevation of one construction in a plane containing the axis of the rotor and in the form of a half section to facilitate illustration on an adequate scale, while Figure 2 is a similar view to Figure 1 of an alternative construction according to the invention embodying cooling for a bearing supporting the shaft.

In the construction shown in Figure 1 the rotor assembly comprises a shaft A having a portion $A^1$ of reduced external diameter terminating at one end in a shoulder $A^2$ and provided with a series of splines $A^3$ and a screwthreaded portion $A^4$. Mounted upon a cylindrical part $A^1$ of the shaft between the splines $A^3$ and the screwthreaded $A^4$ and so as to make a close sliding fit with this part of the shaft is a rotor disc B carrying a series of blades $B^1$ constituting the high pressure stage of a turbine. Connected to the disc B is one end of a tubular connecting piece D the connection being by way of a spigot joint comprising a female part $B^2$ on the disc B and a male part $D^3$ upon the connecting piece D, and by a series of bolts C. The other end of the tubular connecting piece D is connected to a second disc F by a spigot joint comprising a female part E on the disc F and a male part $D^4$ upon the connecting piece D, and a series of bolts $C^1$, the second disc F carrying a series of blades $F^1$ constituting the low pressure stage of the turbine. The disc F has formed on the face which lies adjacent to the disc B an annular hollow boss $F^2$ which makes a close sliding fit within the bore of an end portion $A^5$ of the shaft A, the end faces $A^6$ and $F^3$ of the interengaging portions of the shaft and boss $F^2$ being axially spaced from the adjacent axially alined parts of the disc B and shaft A, respectively, thereby maintaining said disc and shaft concentric while permitting them to have limited free axial movement and limited free movement of rotation with respect to each other. Interposed between the rings of blades $B^1$ and $F^1$ is a ring of stator blades G carried by a stator casing indicated at $G^1$ and supporting an annular sealing assembly $G^2$ carrying sealing elements $G^3$ which make a close sealing fit with a cylindrical portion $D^1$ of the tubular connecting piece D.

Mounted upon the shaft A is a sleeve H the bore of which is provided with splines to engage the splines $A^3$, one end of this sleeve bearing against the shoulder $A^2$ while its other end is provided with a flange $H^1$ having formed on its face remote from the shoulder $A^2$ a set of radial splines or ribs $H^2$ which are engaged by a corresponding set of radial splines or ribs $B^3$ on the adjacent face of the hub portion $B^4$ of the disc B. The hub portion $B^4$ of the disc B and the sleeve H, $H^1$ are firmly clamped together between the shoulder $A^2$ and a clamping nut J mounted upon the screwthreaded part $A^4$ of the shaft A.

The shaft A is supported from a main structural part K of the turbine by a ball bearing $K^1$ interposed between the part K and the sleeve H as shown, the part K also conveniently being provided with sealing parts $K^2$ on each side of the ball bearing $K^1$, making a sealing fit with the adjacent parts of the sleeve H to prevent unwanted escape of oil from the bearing.

In the construction shown in Figure 2 the rotor assembly comprises a shaft L having an end part $L^1$ of reduced external diameter terminating at one end in a shoulder $L^2$ and having external splines $L^3$ and a screwthread $L^4$ formed thereon and including an extreme end portion $L^5$ projecting beyond the screwthreaded portion $L^4$. Mounted upon and making a close sliding fit with an externally cylindrical part of the shaft L between the splines $L^3$ and the screwthread $L^4$ is the hub portion M of a rotor disc $M^1$ carrying a ring of blades $M^2$ constituting the high pressure stage of the turbine. The disc $M^1$ is connected by a tubular connecting piece D, $D^1$ to a second rotor disc F in exactly the same manner as the rotor disc B is connected to the second disc F in the construction shown in Figure 1, the rotor disc F, as in Figure 1, being provided with a hollow boss $F^2$ freely but closely engaging the bore of a projecting part $L^5$ of the shaft L as shown. Interposed between the blade rings $M^2$ and $F^1$ is a stator blade ring G with associated parts similar to the stator blade ring G and its associated parts in Figure 1. Since the construction and arrangement of the disc F and its associated parts, the tubular distance piece D, $D^1$ making a rigid connection between the discs $M^1$ and F, and the stator blade ring G and its associated parts are precisely the same as in Figure 1, corresponding reference letters have been given to the appropriate parts and these parts will not be further described with relation to Figure 2.

Mounted upon the part $L^1$ of the shaft L between the hub portion M of the disc $M^1$ and the shoulder $L^2$ is a sleeve N having an internally splined portion to engage the splines $L^3$, an unsplined end portion $N^1$ which makes a close sliding fit with a short cylindrical surface $L^6$ on the shaft L and a flange $N^2$ which makes a close sliding fit with the cylindrical surface of the part $L^1$ of the shaft L. The flange $N^2$ has formed on its face remote from the shoulder $L^2$ a series of radial splines or ribs $N^3$ which engage corresponding radial splines or ribs on the adjacent face of the hub portion M of the disc $M^1$. The sleeve N is provided with an external shoulder $N^4$ against which bears one end of the inner race O of a roller bearing $O^1$ surrounding the sleeve N, the other end of this race being engaged by one end of the sleeve P which also closely surrounds the sleeve N and whose other end bears through a distance piece Q against the shoulder $L^2$. A nut J similar to the nut J in Figure 1 and engaging the screwthreaded part $L^4$ of the shaft L serves to clamp between it and the shoulder $L^2$ the hub portion M of the discs $M^1$, the sleeve N, the inner race O, the sleeve P and the distance piece Q.

The sleeve P is provided on its external surface with three sets of circumferential ribs $P^1$ separated by grooves $P^2$, $P^3$ and is surrounded by a plain cylindrical sleeve R having holes therein which communicate respectively with the grooves $P^2$ and $P^3$ as shown. The part of the sleeve N adjacent to the flange $N^2$ is also formed externally with two sets of circumferential ribs $N^5$ separated by a groove $N^6$ and surrounded by a plain sleeve S provided with an aperture communicating with the groove $N^6$.

Surrounding the bearing $O^1$ and the sleeves R and S is a housing T forming part of the main fixed structure of the turbine and formed in two parts, as shown, united by bolts $T^1$, the outer race $O^2$ of the roller bearing being clamped between the two parts as indicated. The housing T has parts which closely surround the sleeves R and S and are provided with annular chambers $T^2$, $T^3$, $T^4$ communicating respectively through the holes in the sleeves R and S with the grooves $P^2$, $P^3$ and $N^6$. The annular chambers $T^2$ and $T^3$ communicate with one another through a small orifice $T^5$ while the annular chambers $T^3$ and $T^4$ both communicate with a chamber $T^6$ into which leads a cooling air pipe $T^7$. The groove $P^2$ communicates through apertures $P^5$ in the sleeve P, an annular recess $P^4$ in this sleeve, and apertures $N^7$ in the sleeve N with an annular chamber U at one end of the splined portion of the shaft L while the groove $N^6$ communicates through apertures $N^8$ with an annular chamber $U^1$ at the other end of this splined portion. It will therefore be seen that when cooling air is delivered through the pipe $T^7$ it passes from the chamber $T^6$ into the chamber $T^4$ and thence through the groove $N^6$ and the passages $N^8$ into the chamber $U^1$ from which it flows along the splines $L^3$, which are formed to provide air passages, into the chamber U and thence through the apertures $N^7$, the groove $P^4$, the apertures $P^5$, the groove $P^2$ and the chamber $T^2$ before escaping through openings $T^8$. At the same time a proportion of the air delivered to the chamber $T^6$ will flow directly into the chamber $T^3$ and thence through the restricted apertures $T^5$ into the chamber $T^2$ and thence through the openings $T^8$. The bearing O, $O^1$, $O^2$, to which lubricant will be delivered by a suitable passage (not shown), will therefore be cooled by air which flows substantially completely around it, thus tending to prevent the flow of excessive heat to it from the disc $M^1$. Moreover it will be seen that, since the air pressure in the chambers $T^3$ and $T^4$ and hence in the grooves $P^3$ and $N^6$ will be approximately the same, any tendency for oil to be blown out of the bearing in one direction or the other by the cooling air is avoided. At the same time the ribs $P^1$ and $N^5$ tend to form labyrinth type seals between the various spaces which, during operation, may be subject to different fluid pressures.

The disc $M^1$ is, in the arrangement shown, provided with a series of holes $M^3$ passing through it, by which cooling air delivered to the space on the left of the disc in known manner can pass through the disc $M^1$ into the chamber between the discs $M^1$ and F and thence through grooves, indicated at $D^2$ between the connecting piece D and the discs $M^1$ and F into the streams of working fluid.

Although the invention has for convenience been shown in the accompanying drawings as applied to a two-stage turbine it will readily be understood that a similar form of assembly may be applied to a turbine including three or more stages, in which event the discs carrying the rotor blade rings constituting the intermediate stages between the highest pressure stage and the lowest pressure stage will be conveniently connected to one another by tubular distance pieces corresponding in arrangement and function to the tubular distance piece D, $D^1$ in the construction shown and will be supported with close but free sliding fits upon the shaft while the disc carrying the blade ring constituting the lowest pressure stage may have a hollow boss corresponding to the boss $F^2$ in the constructions illustrated, and freely but closely engaging the bore of the end of the shaft.

Since constructions according to the invention tend to reduce disc vibration, the weight of the discs employed may be reduced.

It will be apparent that a rotor assembly according to the present invention may be used in a turbine in combination with one or more stator blade assemblies constructed as described in the specification of the copending British patent application No. 17,413 of 1952.

What we claim as our invention and desire to secure by Letters Patent is:

1. A multi-stage turbine rotor assembly comprising a hollow shaft and a plurality of blade carrying discs axially spaced on said shaft, means securing one of said discs rigidly to an intermediate portion of said shaft, said means providing a driving connection between said first disc and shaft, means concentrically supporting a second of said discs at an end of said shaft, said disc supporting means including a concentric cylindrical flange on said second disc circumferentially engaging and having limited movement within the hollow end of the shaft, the second disc and end face of said flange being spaced axially from the end face of said shaft and from any axially alined interior part of said shaft respectively, thereby maintaining said second disc concentric with the shaft but permitting it limited axial movement and limited movement of rotation relatively to the shaft, and a tubular connecting piece concentric with said first and second discs extending between and fixedly secured to parts of said discs adjacent to their outer circumferences and maintaining the discs adjacent their outer circumferences in angular circumferential alinement.

2. A multi-stage turbine rotor assembly comprising a shaft and at least two spaced parallel blade carrying discs mounted thereon, means for connecting one of said discs to said shaft to secure it against axial and rotational movement relatively to the shaft, interengaging part cylindrical concentric axially overlapping relatively movable parts integrally formed respectively on the other disc and the shaft, said interengaging parts and adjacent portions of said other disc and shaft being spaced apart axially from axially aligned portions of said shaft and other disc, thereby maintaining said other disc concentric with the shaft while permitting it limited freedom of axial and rotational movement relative to the shaft, and a tubular connecting piece concentric with the discs and extending between and fixedly secured to parts of the discs situated adjacent to their outer circumferences thereby positively holding the discs together and preventing relaive axial and rotational movement of either one with respect to the other adjacent to their outer circumferences.

3. A multi-stage turbine rotor assembly as claimed in claim 2 in which the shaft is provided with external splines adjacent to an abutment shoulder thereon and the discs connected thereto has radial splines on one of its faces, and the means securing said connected disc rigidly to the shaft comprises a sleeve which has internal splines engaging said external splines on the shaft and is located at one end relatively to the shaft by said abutment shoulder, and said sleeve has a flange formed on its end remote from the abutment shoulder with radial splines formed on the face of the flange remote from the abutment shoulder corresponding to and engaging with said radial splines on one face of the disc, said rigidly connected disc being clamped firmly against said flange by a suitable clamping means adjustable axially on the shaft.

4. A multi-stage turbine rotor assembly as claimed in claim 3, in which the shaft is journaled on an anti-friction bearing comprising inner and outer members and the inner member of said anti-friction bearing is mounted on said sleeve whereby the bearing is partially heat-insulated from the shaft by the sleeve.

5. A multi-stage turbine rotor assembly as claimed in claim 4, in which the sleeve contains at least one cooling air passage extending between its inner circumferential surface and the outer circumferential surface of the shaft providing for flow of cooling air to and from said shaft surface.

References Cited in the file of this patent

UNITED STATES PATENTS

| | | |
|---|---|---|
| 2,213,940 | Jendrassik | Sept. 3, 1940 |
| 2,618,463 | Lombard | Nov. 18, 1952 |
| 2,675,174 | McDowall | Apr. 13, 1954 |
| 2,749,086 | Lombard | June 5, 1956 |

FOREIGN PATENTS

| | | |
|---|---|---|
| 809,864 | Germany | Aug. 2, 1951 |